(12) United States Patent
Park et al.

(10) Patent No.: US 10,855,817 B2
(45) Date of Patent: Dec. 1, 2020

(54) METHOD AND APPARATUS FOR NETWORK ENCODING BASED ON LOW-COMPLEXITY ALGORITHMS FOR NETWORK CODING USING MATRIX DECOMPOSITION

(71) Applicant: Ewha University—Industry Collaboration Foundation, Seoul (KR)

(72) Inventors: Hyunggon Park, Goyang-si (KR); Jungmin Kwon, Goyang-si (KR)

(73) Assignee: Ewha University—Industry Collaboration Foundation, Seoul (KR)

( * ) Notice: Subject to any disclaimer, the term of this patent is extended or adjusted under 35 U.S.C. 154(b) by 98 days.

(21) Appl. No.: 15/957,689

(22) Filed: Apr. 19, 2018

(65) Prior Publication Data

US 2018/0332147 A1 Nov. 15, 2018

(30) Foreign Application Priority Data

May 12, 2017 (KR) ........................ 10-2017-0059396

(51) Int. Cl.
*H04L 29/08* (2006.01)
*H04W 52/00* (2009.01)
(Continued)

(52) U.S. Cl.
CPC .............. *H04L 69/324* (2013.01); *H04L 1/00* (2013.01); *H04L 1/0076* (2013.01); *H04W 52/00* (2013.01); *H04W 4/70* (2018.02)

(58) Field of Classification Search
None
See application file for complete search history.

(56) References Cited

U.S. PATENT DOCUMENTS

| 8,229,017 B1* | 7/2012 | Lee .................... H04B 7/0665 375/267 |
| 10,740,693 B2* | 8/2020 | Lazovich ............... G06N 20/00 |

(Continued)

FOREIGN PATENT DOCUMENTS

| KR | 100722415 B1 | 5/2007 |
| KR | 1020080006324 A | 1/2008 |

(Continued)

OTHER PUBLICATIONS

Fiandrotti et al., Band Codes: Controlled Complexity Network Coding for Peer-to-Peer Video Streaming, IEEE International Conference on Multimedia and Expo, (2012), pp. 194-199.

(Continued)

*Primary Examiner* — Steve R Young
(74) *Attorney, Agent, or Firm* — TraskBritt

(57) ABSTRACT

Provided are a network encoding method and apparatus, and a network decoding method and apparatus that performs network encoding and decoding through a transposed matrix of a unitary matrix decomposed from an encoding coefficient matrix by an eigen-decomposition. The network encoding method may include generating a random symmetric matrix indicating a binary square matrix, extracting an encoding coefficient matrix by decomposing the generated random symmetric matrix, generating encoding data by encoding source data using the extracted encoding coefficient matrix, forming a data packet including the generated encoding data and the encoding coefficient matrix, and converting the formed data packet from a real number field to a Galois field.

9 Claims, 6 Drawing Sheets

(51) Int. Cl.
*H04L 1/00* (2006.01)
*H04W 4/70* (2018.01)

(56) References Cited

U.S. PATENT DOCUMENTS

| | | | | |
|---|---|---|---|---|
| 2002/0013801 | A1* | 1/2002 | Kobayashi | G06F 17/16 708/607 |
| 2006/0285606 | A1* | 12/2006 | Khojastepour | H04W 52/346 375/267 |
| 2008/0192853 | A1* | 8/2008 | Kent | H04L 25/0222 375/262 |
| 2010/0131817 | A1* | 5/2010 | Kong | H04L 1/188 714/749 |
| 2012/0163482 | A1* | 6/2012 | Dateki | H04L 1/1812 375/259 |
| 2014/0153660 | A1* | 6/2014 | Vaman | H04L 27/3405 375/262 |
| 2020/0036414 | A1* | 1/2020 | Shattil | H04B 7/024 |

FOREIGN PATENT DOCUMENTS

| KR | 2008-0075442 A | 8/2008 |
|---|---|---|
| KR | 1020100119660 A | 11/2010 |
| KR | 101555315 B1 | 9/2015 |
| KR | 101643848 B1 | 7/2016 |

OTHER PUBLICATIONS

Kwon et al., Low Complexity Algorithms for Network Coding Based on Singular Value Decomposition, IEEE Communications Society, Eighth International Conference on Ubiquitous and Future Networks, Jul. 5-8, 2016, 5 pages.
Kwon, Jungmin., Matrix Decomposition Based Low Complexity Algorithms for Network Coding, Ewha Womans University, (Feb. 2017), 35 pages.
Kwon et al., Low-Complexity Network Coding and Decoding Method Using Unitary Matrix, Proceeding of KNOM 2016 Conference, (2016), 5 pages.
Park et al., Low Complexity Algorithms for Network Coding and Decoding Based on Unitary Hessenberg Matrix, 2016 Annual Conference of the Korean Institute of Communication Sciences, vol. 60, (2016), 6 pages.
Wang et al., Random Linear Network Coding with Ladder-Shaped Gloval Coding Matrix for Robust Video Transmission, J. Vis. Commun. Image R., vol. 22, (2011), pp. 203-212.

* cited by examiner

US 10,855,817 B2

METHOD AND APPARATUS FOR NETWORK ENCODING BASED ON LOW-COMPLEXITY ALGORITHMS FOR NETWORK CODING USING MATRIX DECOMPOSITION

CROSS-REFERENCE TO RELATED APPLICATION

This application claims the priority benefit of Korean Patent Application No. 10-2017-0059396 filed on May 12, 2017, in the Korean Intellectual Property Office, the disclosure of which is incorporated herein in its entirety by this reference for all purposes.

TECHNICAL FIELD

One or more example embodiments relate to a network encoding method and apparatus and a network decoding method and apparatus based on low-complexity algorithms for network coding using a matrix decomposition, and more particularly, to a network encoding method and apparatus and a network decoding method and apparatus using a unitary matrix obtained through an eigen-decomposition.

BACKGROUND

With the popularization of user terminals such as smart phones or tablet personal computers (PCs), data usage is rapidly increasing. In particular, the introduction of Internet of Things (IoT) technology is predicted to accelerate the data usage further. However, now a data transmission rate is reaching its limit due to network saturation. Thus, research on network coding is being conducted to solve a number of issues caused by the network saturation occurring when existing communication methods are used.

Most of the power consumption of a system to which network coding is applied occurs during a decoding process. Thus, a terminal performing decoding has a great power consumption, which leads to an issue related to heat and batteries and an issue related to a great memory consumption for a complex computation. In addition, the complex computation increases an overall network complexity.

Accordingly, there is a need to reduce power consumption for decoding and reduce high complexity for complex computation.

BRIEF SUMMARY

An aspect provides a network encoding method and apparatus that may generate encoding data from source data by extracting an encoding coefficient matrix through a matrix decomposition.

Another aspect also provides a network encoding method and apparatus that may generate encoding data from source data using a unitary matrix as an encoding coefficient matrix through a matrix decomposition by an eigen-decomposition.

Still another aspect also provides a network decoding method and apparatus that may determine source data from encoding data through a transposed matrix of an encoding coefficient matrix.

According to an aspect, there is provided a network encoding method including generating a random symmetric matrix indicating a binary square matrix, extracting an encoding coefficient matrix by decomposing the generated random symmetric matrix, generating encoding data by encoding source data using the extracted encoding coefficient matrix, forming a data packet including the generated encoding data and the encoding coefficient matrix, and converting the formed data packet from a real number field to a Galois field.

The random symmetric matrix may be decomposed into a unitary matrix, a diagonal matrix, and a transposed matrix of the unitary matrix.

The encoding coefficient matrix may be the unitary matrix decomposed from the random symmetric matrix.

The random symmetric matrix may be a square matrix of which matrix components are symmetric with respect to a diagonal.

The matrix components may be selected at random from "0" or "1."

The diagonal matrix may include components determined to be real numbers.

According to another aspect, there is also provided a network decoding method including converting a data packet including encoding data encoded from source data and an encoding coefficient matrix from a Galois field to a real number field, extracting the encoding coefficient matrix and the encoding data from the converted data packet, and determining the source data based on the extracted encoding data and a transposed matrix of the extracted encoding coefficient matrix.

The encoding coefficient matrix may be derived from a random symmetric matrix, and the random symmetric matrix may be decomposed into a unitary matrix, a diagonal matrix, and a transposed matrix of the unitary matrix.

The encoding coefficient matrix may be the unitary matrix decomposed from the random symmetric matrix, and the determining may include determining the source data by applying the transposed matrix of the unitary matrix to the extracted encoding data.

According to still another aspect, there is also provided a network encoding apparatus including a processor. The processor may be configured to generate a random symmetric matrix indicating a binary square matrix, extract an encoding coefficient matrix by decomposing the generated random symmetric matrix, generate encoding data by encoding source data using the extracted encoding coefficient matrix, form a data packet including the generated encoding data and the encoding coefficient matrix, and convert the formed data packet from a real number field to a Galois field.

The random symmetric matrix may be decomposed into a unitary matrix, a diagonal matrix, and a transposed matrix of the unitary matrix.

The encoding coefficient matrix may be the unitary matrix decomposed from the random symmetric matrix.

The random symmetric matrix may be a square matrix of which matrix components are symmetric with respect to a diagonal.

The matrix components may be selected at random from "0" or "1."

The diagonal matrix may include components determined to be real numbers.

According to yet another aspect, there is also provided a network decoding apparatus including a processor. The processor may be configured to convert a data packet including encoding data encoded from source data and an encoding coefficient matrix from a Galois field to a real number field, extract the encoding coefficient matrix and the encoding data from the converted data packet, and determine the source data based on the extracted encoding data and a transposed matrix of the extracted encoding coefficient matrix.

The encoding coefficient matrix may be derived from a random symmetric matrix, and the random symmetric matrix may be decomposed into a unitary matrix, a diagonal matrix, and a transposed matrix of the unitary matrix.

The encoding coefficient matrix may be the unitary matrix decomposed from the random symmetric matrix, and the processor may be configured to determine the source data by applying the transposed matrix of the unitary matrix to the extracted encoding data.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, some example embodiments will be described in detail with reference to the accompanying drawings.

Figure 1:
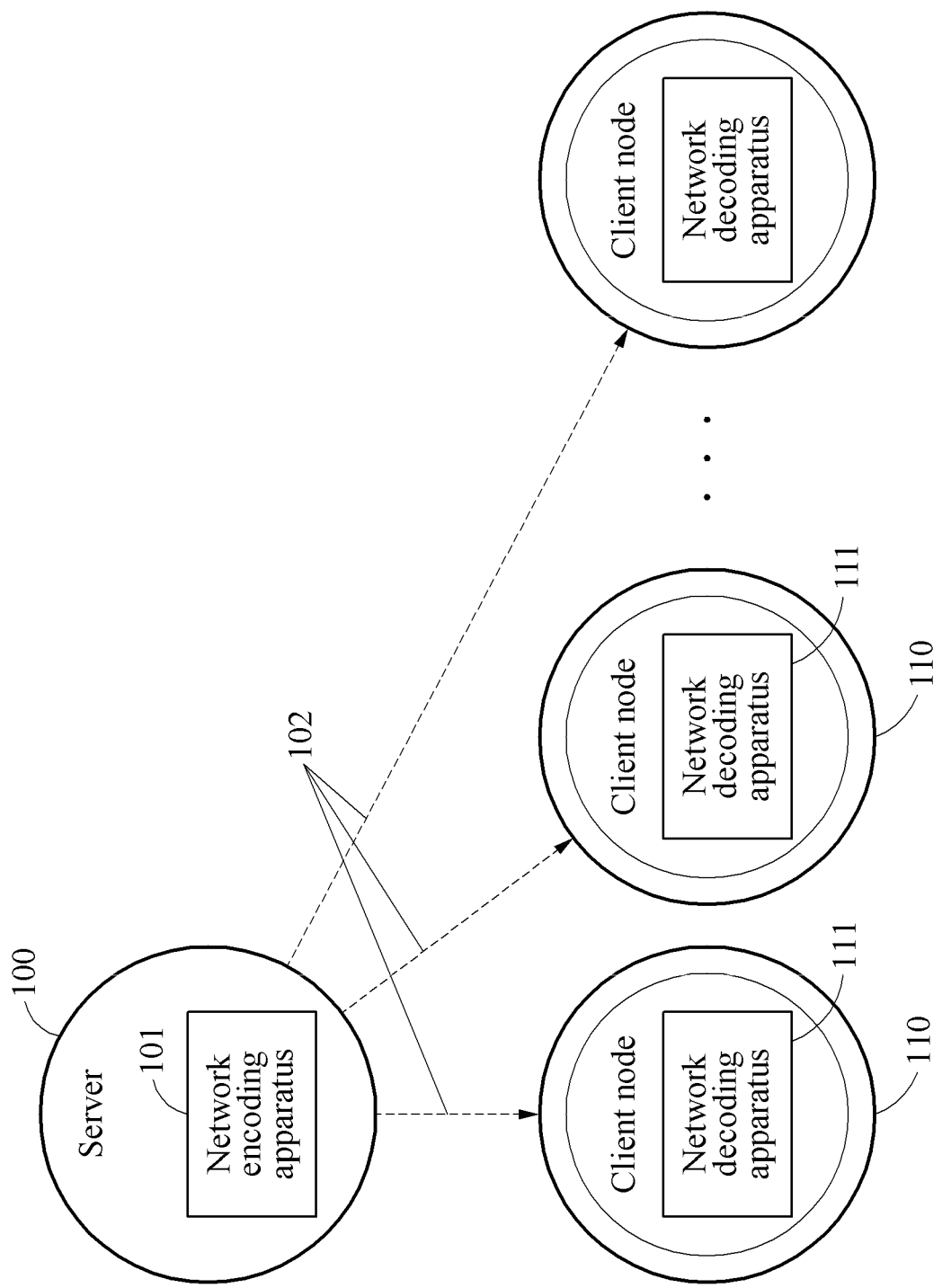
FIG. 1 is a diagram illustrating a relationship between a server and client nodes according to an example embodiment.

FIG. 1 is a diagram illustrating a relationship between a server and client nodes according to an example embodiment.

Referring to FIG. 1, a server 100 may transmit encoding data to a plurality of client nodes through a network encoding apparatus 101. The server 100 may generate the encoding data by encoding source data through the network encoding apparatus 101. In this example, field conversion may be performed on the generated encoding data, and the converted encoding data may be transmitted to the plurality of client nodes via wired/wireless connections 102.

The plurality of client nodes may receive the converted encoding data from the server 100 and generate the source data through field conversion and decoding. For example, a client node 110 may determine the source data by decoding the encoding data received from the server 100 through a network decoding apparatus 111.

In this example, network encoding/decoding may increase an amount of data to be transmitted over a network. Thus, the network encoding may be used for effective content transmission in a massive network such as Internet of Things (IoT) or a peer-to-peer network.

Figure 2:
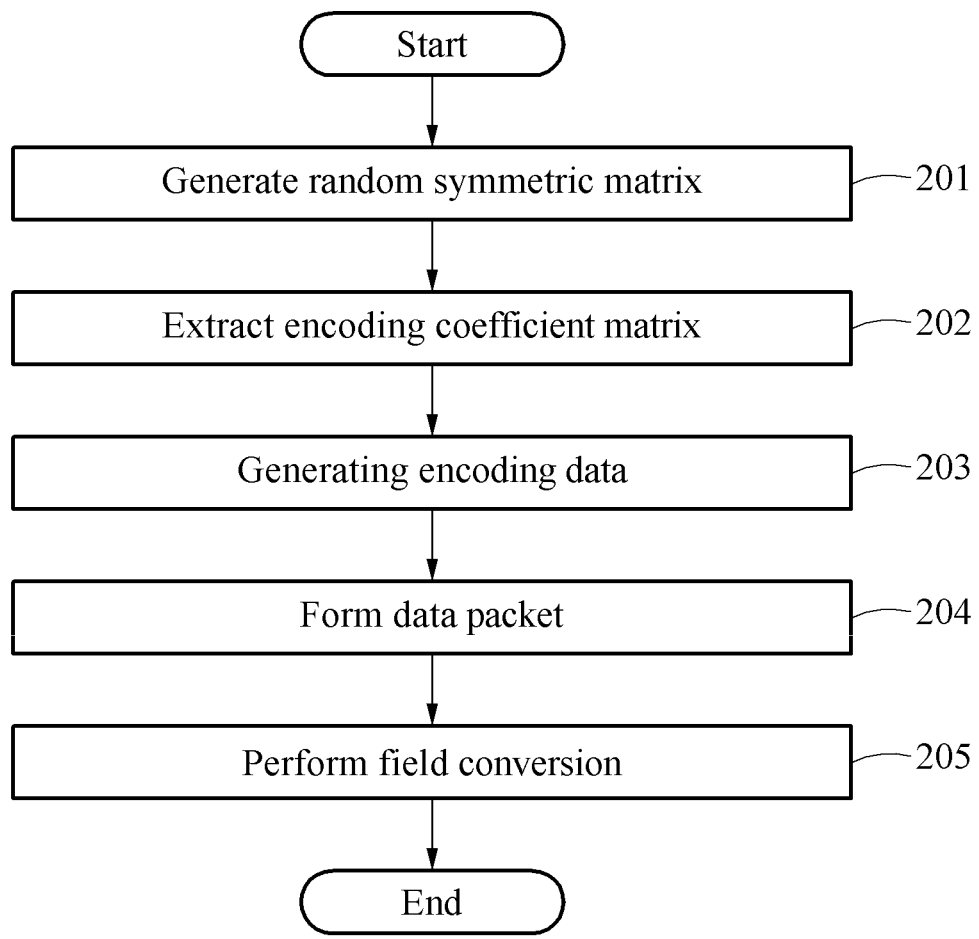
FIG. 2 is a flowchart illustrating a network encoding method performed by a network encoding apparatus according to an example embodiment.

FIG. 2 is a flowchart illustrating a network encoding method performed by a network encoding apparatus according to an example embodiment.

Referring to FIG. 2, in operation 201, the network encoding apparatus 101 may generate a random symmetric matrix indicating a binary square matrix. In this example, the random symmetric matrix may be a square matrix including matrix components of "0" or "1."

The random symmetric matrix may be a matrix of which matrix components selected at random are symmetric with respect to a diagonal. For example, in the random symmetric matrix, matrix components of an upper triangular matrix with respect to the diagonal may be selected at random from "0" or "1," and matrix components of a lower triangular matrix may be symmetric to those of the upper triangular matrix with respect to the diagonal.

The random symmetric matrix may be decomposed by an eigen-decomposition. For example, the random symmetric matrix may be decomposed into a unitary matrix, a diagonal matrix, and a transposed matrix of the unitary matrix. However, an example of decomposing the random symmetric matrix by the eigen-decomposition is not limited thereto, and may be decomposed in another form for extracting the unitary matrix.

In another example, the random symmetric matrix may be decomposed using a QR-decomposition, in addition to the eigen-decomposition. In a case of using the QR-decomposition, the random symmetric matrix may be represented by a product of the unitary matrix and the upper triangular matrix. That is, in addition to the eigen-decomposition and the QR-decomposition, the random symmetric matrix may be decomposed by another method including the unitary matrix.

For example, the random symmetric matrix may be $H(\in R^{N*N})=[h_1, h_2, \ldots, h_N]$ where $h_j=[h_j(1), h_j(2), \ldots, h_j(N)]^T$, where $h_j$ denotes a j-th column for $1 \leq j \leq N$. The random symmetric matrix H may be decomposed by the eigen-decomposition as $H=U*S*U^T=\Sum_{i=1}^{N} s_i*u_i*u_i^T=\Sum_{i=1}^{N} s_i*e_i$, where $e_i$ denotes a unitary matrix in which only an i-th element is "1" and all the other elements are "0."

In this example, U denotes an N*N unitary matrix. $U=[u_1, u_2, \ldots, u_N]^T$, and $u_i=[u_i(1), u_i(2), \ldots, u_i(N)]$. Further, S denotes a diagonal matrix $S=diag(s_1, s_2, \sim, s_n)$, and $s_1, s_2, \sim, s_n$ may be real numbers.

The unitary matrix may be a matrix satisfying $U*U^T=I$. That is, an inverse matrix of the unitary matrix may be a transposed matrix of the unitary matrix. The transposed matrix may be a matrix in which rows and columns are switched. For example, in a case of a matrix $$A = \begin{matrix} a_{11} & a_{12} & a_{13} \\ a_{21} & a_{22} & a_{23} \end{matrix},$$

a transposed matrix of the matrix A may be $$A^T = \begin{matrix} a_{11} & a_{21} \\ a_{12} & a_{22} \\ a_{13} & a_{23} \end{matrix}.$$

In this example, an inverse matrix of the matrix A may be the same as the transposed matrix thereof. The diagonal matrix may be a square matrix in which all matrix components, excluding matrix components corresponding to a diagonal, are "0." For example, an n-order diagonal matrix $$\begin{bmatrix} s_1 & \cdots & 0 \\ \vdots & \ddots & \vdots \\ 0 & \cdots & s_n \end{bmatrix}$$

may be represented by diag($s_1$, $s_2$, ~, $s_n$).

In operation 202, the network encoding apparatus 101 may extract an encoding coefficient matrix by decomposing the generated random symmetric matrix by the eigen-decomposition. In this example, the encoding coefficient matrix may be the unitary matrix decomposed from the random symmetric matrix.

For example, in $H=U*S*U^T$ decomposed from the random symmetric matrix H by the eigen-decomposition, the encoding coefficient matrix C=U. The random symmetric matrix H may be decomposed in a form of the unitary matrix*the diagonal matrix*the transposed matrix of the unitary matrix. However, example embodiments are not limited thereto. The random symmetric matrix H may be decomposed in another form for obtaining the unitary matrix.

In this example, the random symmetric matrix H may be a symmetric matrix generated at random to obtain the unitary matrix U, and thus the encoding coefficient matrix C may have no relation to source data.

In operation 203, the network encoding apparatus 101 may generate encoding data by encoding the source data using the extracted encoding coefficient matrix.

The source data X may be $X(\in R^{N*L})=[x_1, x_2, \ldots, x_N]$ $x_i=[x_i(1), x_i(2), \ldots, x_i(L)]^T$ denotes data $x_i$ requested by a client node, and $x_i$ (j) denotes a j-th component in the data $x_i$ of a length L. In this example, N denotes the number of items of the source data respectively requested by N client nodes.

The encoding data may be generated through a matrix product of the encoding coefficient matrix and the source data. For example, encoding data y may be generated through $y=\sum_{i=1}^{N} c_i * x_i = \sum_{i=1}^{N} u_i * x_i$. That is, $$\begin{pmatrix} y_1(1) & \cdots & y_1(L) \\ \vdots & \ddots & \vdots \\ y_N(1) & \cdots & y_N(L) \end{pmatrix} = \begin{pmatrix} u_1(1) & \cdots & u_N(1) \\ \vdots & \ddots & \vdots \\ u_1(N) & \cdots & u_N(N) \end{pmatrix} \begin{pmatrix} x_1(1) & \cdots & x_1(L) \\ \vdots & \ddots & \vdots \\ x_N(1) & \cdots & x_N(L) \end{pmatrix}.$$

In this example, the encoding coefficient matrix $c_i$ may be represented as $c_i=[c_i(1), c_i(2), \ldots, c_i(N)]$.

In operation 204, the network encoding apparatus 101 may form a data packet including the encoding data and the encoding coefficient matrix.

For example, $z_k(j)$ denotes a j-th element of a k-th data packet. That is, $z_k(j)$ may be expressed as in Equation 1. $z_k(j)$ denotes the encoding coefficient matrix for $1 \leq j < N+1$, and $z_k(j)$ denotes the encoding data for $N+1 \leq j < N+L$.

$$z_k(j) = \begin{cases} c_j(k), & \text{for } 1 \leq j \leq N+1 \\ y_k(j-N), & \text{for } N+1 \leq j \leq N+L \end{cases} \quad \text{Equation 1}$$

Table 1 shows data packets including encoding coefficient matrices and encoding data. For examples, encoding coefficient matrices on a first row may form a header of a first packet and encoding data may form a payload of the first packet. Encoding coefficient matrices on a second row may form a header of a second packet and encoding data may form a payload of the second packet. Encoding coefficient matrices on a third row may form a header of a third packet and encoding data may form a payload of the third packet.

TABLE 1

| $c_1(1)$ | $c_2(1)$ | $c_3(1)$ | $y_1$ |
|---|---|---|---|
| $c_1(2)$ | $c_2(2)$ | $c_3(2)$ | $y_2$ |
| $c_1(3)$ | $c_2(3)$ | $c_3(3)$ | $y_3$ |

In operation 205, the network encoding apparatus 101 may convert the formed data packet from a real number field to a Galois field. The network encoding apparatus 101 may convert the data packet from the real number field to the Galois field before transmitting the data packet to a client node.

In this example, a relationship between the real number field and the Galois field may be expressed as in Equation 2.

$$\begin{cases} 1_{RG}: R \to GF & 1_{RG}(z) = p \\ 1_{GR}: GF \to R & 1_{GR}(p) = z \end{cases} \quad \text{Equation 2}$$

p of the Galois field may be a component corresponding to a data packet z of the real number field. Thus, p converted to the Galois field may be transmitted from the server 100 to a plurality of client nodes.

Figure 3:
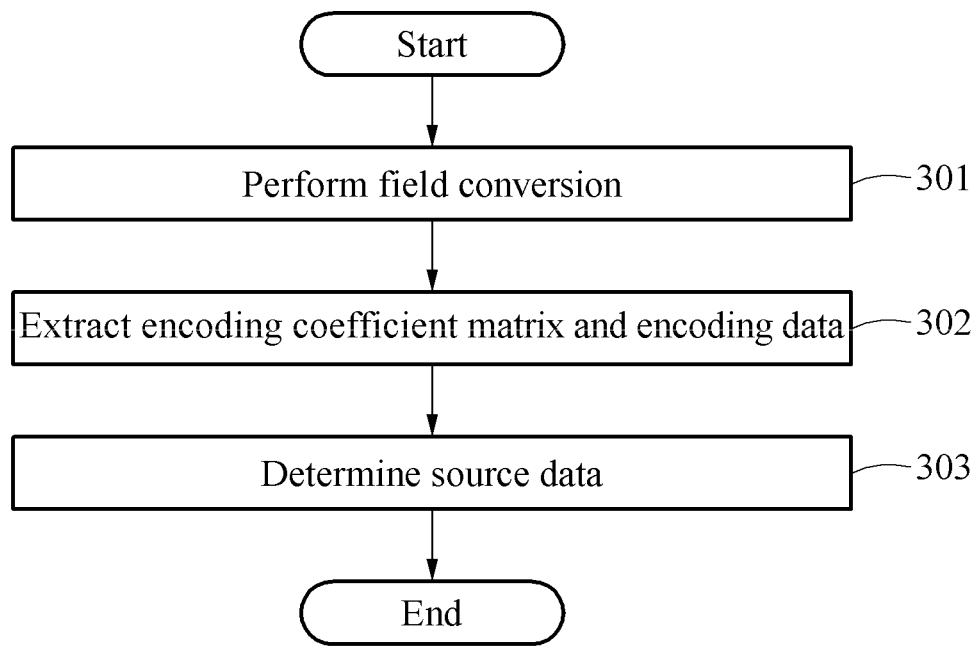
FIG. 3 is a flowchart illustrating a network decoding method performed by a network decoding apparatus according to an example embodiment.

FIG. 3 is a flowchart illustrating a network decoding method performed by a network decoding apparatus according to an example embodiment.

Referring to FIG. 3, in operation 301, a network decoding apparatus may receive a data packet including encoding data encoded from source data and an encoding coefficient matrix, and convert the received data packet from a Galois field to a real number field.

In operation 302, the network decoding apparatus may extract the encoding coefficient matrix and the encoding data from the converted data packet. In the example of Table 1, the network decoding apparatus receiving the first packet through the third packet may extract the encoding coefficient matrices and the encoding data from the header portions and the payload portions.

In operation 303, the network decoding apparatus may determine the source data using the extracted encoding data and a transposed matrix of the extracted encoding coefficient matrix.

Since the encoding coefficient matrix is a unitary matrix, an inverse matrix of the encoding coefficient matrix may be obtained through the transposed matrix of the encoding coefficient matrix. Thus, the source data may be obtained by applying the transposed matrix of the encoding coefficient matrix to the encoding data. Hence, the computational complexity may be improved using a characteristic of the unitary matrix when calculating the inverse matrix of the encoding coefficient matrix.

For example, it is assumed that the source data is X, the encoding coefficient matrix is C, and the encoding data is Y. Through $X=C^{-1}*Y=C^{T}*Y$, the source data may be obtained. That is, through a matrix calculation such as $$\begin{pmatrix} X_1(1) & \cdots & X_1(L) \\ \vdots & \ddots & \vdots \\ X_N(1) & \cdots & X_N(L) \end{pmatrix} = \begin{pmatrix} u_1(1) & \cdots & u_N(1) \\ \vdots & \ddots & \vdots \\ u_1(N) & \cdots & u_N(N) \end{pmatrix}^T \begin{pmatrix} Y_1(1) & \cdots & Y_1(L) \\ \vdots & \ddots & \vdots \\ Y_N(1) & \cdots & Y_N(L) \end{pmatrix},$$

the source data X may be obtained. Thus, the computational complexity for calculating the inverse matrix of the encoding coefficient matrix may be improved. That is because a calculation of the transposed matrix of the encoding coefficient matrix is easier than a calculation of the inverse matrix of the encoding coefficient matrix.

Figure 4:
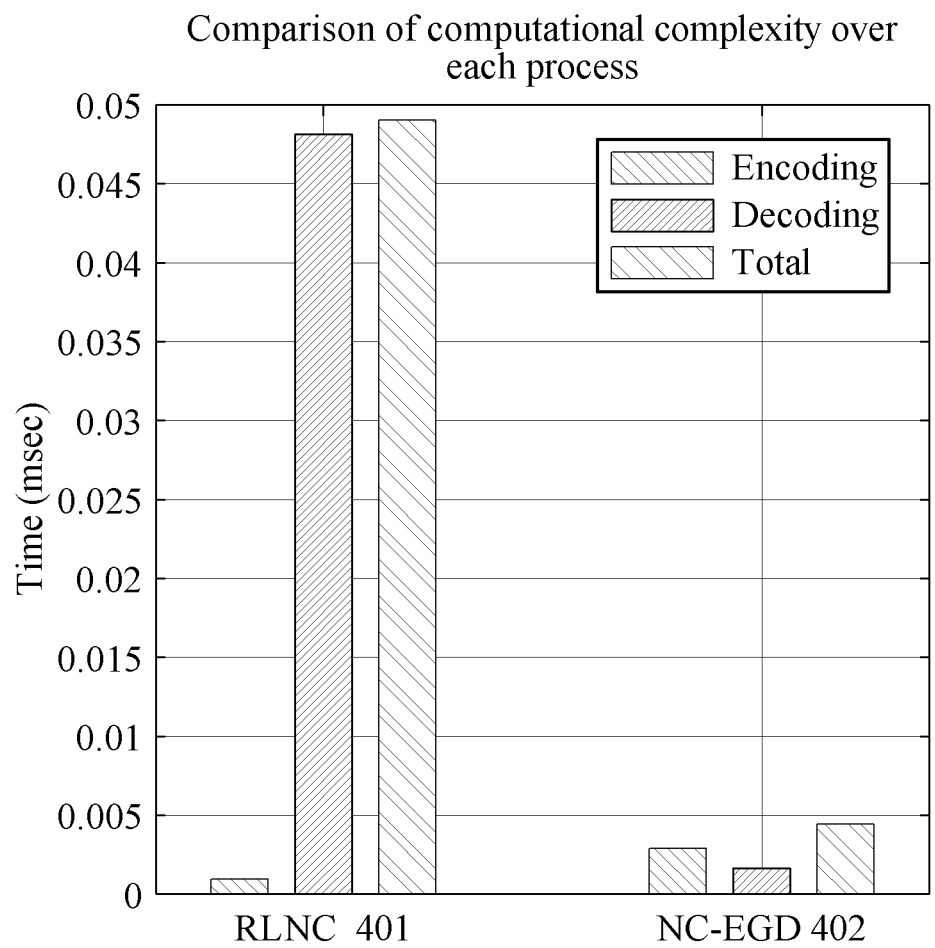
FIG. 4 illustrates an experiment result of comparing computational complexities over encoding and decoding according to an example embodiment.

FIG. 4 illustrates an experiment result of comparing computational complexities over encoding and decoding according to an example embodiment.

FIG. 4 shows a time consumption for network encoding/decoding by random linear network coding (RLNC) 401 and a time consumption for network encoding/decoding by network coding-eigen decomposition (NC-EGD) 402. Here, RLNC 401 is an example of network coding that may obtain encoding data through a linear combination of source data and a randomly generated coefficient. A client node may perform decoding to obtain the source data by RLNC 401 using Gaussian elimination.

When comparing time consumptions for network encoding by RLNC 401 and network encoding by NC-EGD 402, both performed by a server, the time consumption of NC-EGD 402 may be greater than the time consumption of RLNC 401. That is, NC-EGD 402 may perform a matrix decomposition through an eigen-decomposition, and thus require a relatively great time consumption for network encoding when compared to RLNC 401.

However, when comparing time consumptions for network decoding by RLNC 401 and network decoding by NC-EGD 402, both performed by the client node, the time consumption of NC-EGD 402 may be less than the time consumption of RLNC 401. Since NC-EGD 402 may calculate an inverse matrix of an encoding coefficient matrix through a transposed matrix of a unitary matrix, NC-EGD 402 may consume a relatively short time for network decoding when compared to RLNC 401.

Hence, a total time consumption for network encoding/decoding by NC-EGD 402 may be improved when compared to a total time consumption for network encoding/decoding by RLNC 401. That is, RLNC 401 may consume a relatively long time for network decoding performed by the client node, whereas NC-EGD 402 may consume a relatively long time for network encoding performed by the server.

Figure 5:
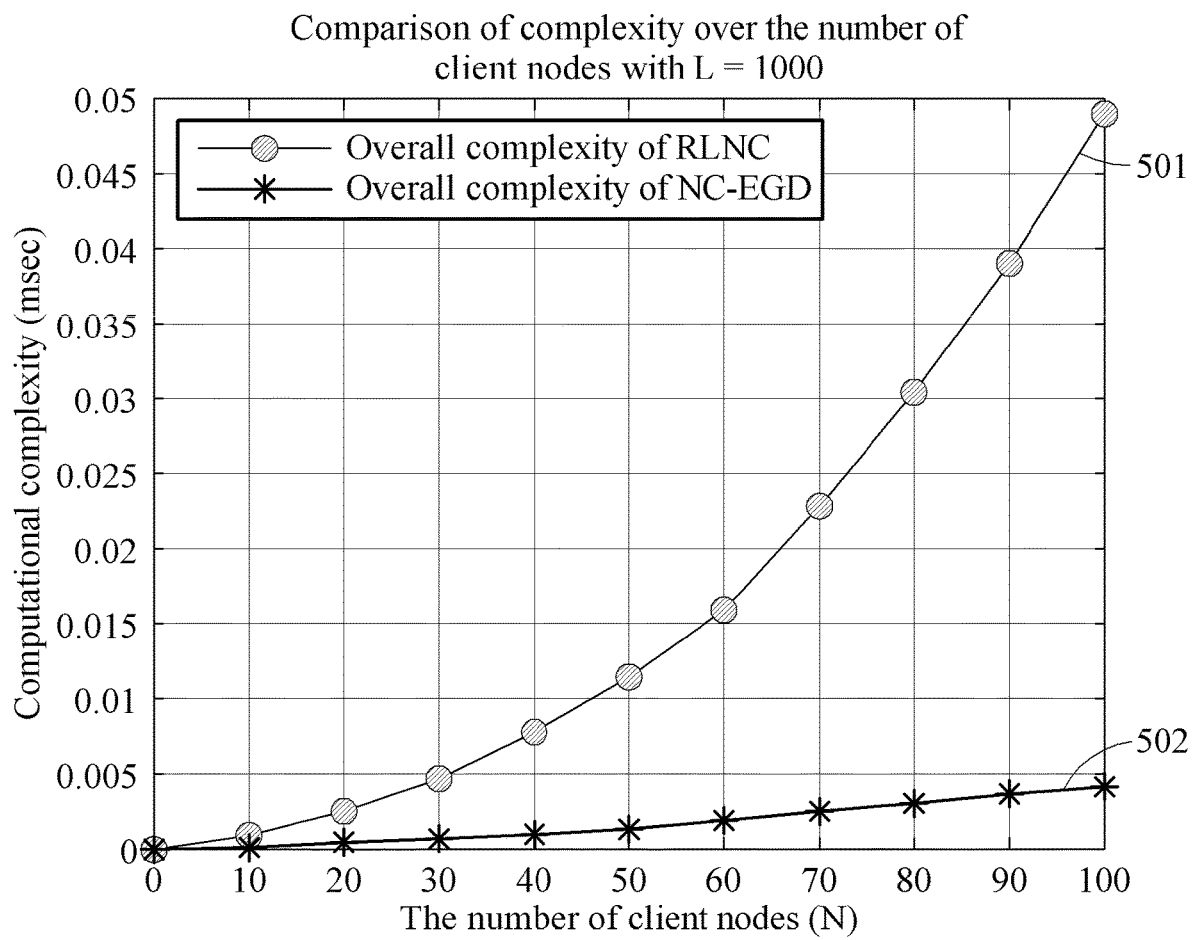
FIG. 5 illustrates an experiment result of comparing computational complexities over the number of client nodes according to an example embodiment.

FIG. 5 illustrates an experiment result of comparing computational complexities over the number of client nodes according to an example embodiment.

FIG. 5 shows a computational complexity for network encoding/decoding by RLNC 501 and a computational complexity for network encoding/decoding by NC-EGD 502.

As the number of client nodes increases, the computational complexity of RLNC 501 and the computational complexity of NC-EGD 502 may also increase. That is, in a case in which a great number of client nodes are connected to a server such as IoT or a peer-to-peer network, the computational complexity of NC-EGD 502 may be predicted to be improved when compared to the computational complexity of RLNC 501. Thus, when network encoding/decoding is performed by NC-EGD 502 suitable for an IoT environment, a computational complexity may be improved, and thus a data transmission rate may be improved greatly.

Figure 6:
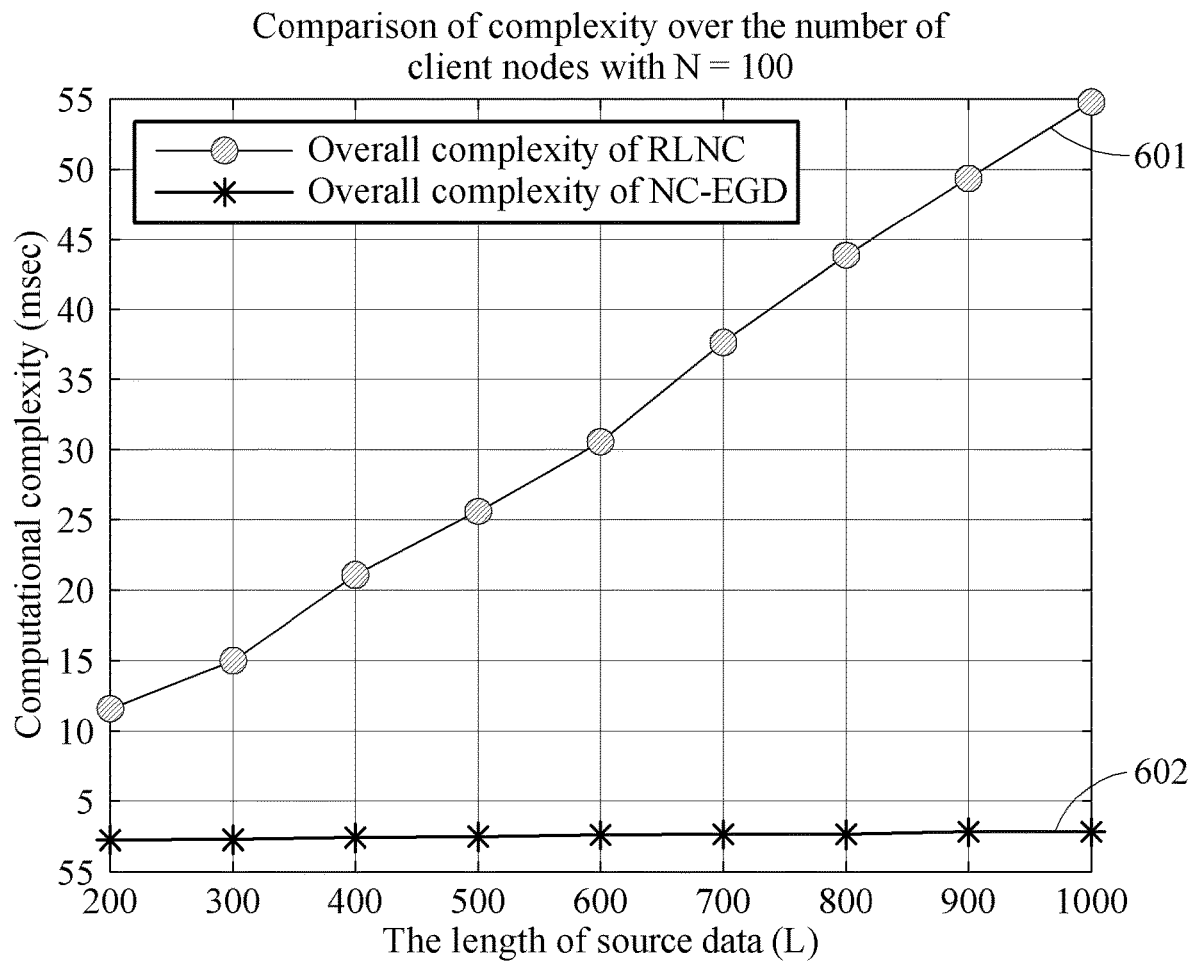
FIG. 6 illustrates an experiment result of comparing computational complexities over the length of source data according to an example embodiment.

FIG. 6 illustrates an experiment result of comparing computational complexities over the length of source data according to an example embodiment.

FIG. 6 shows a computational complexity of RLNC 601 and a computational complexity of NC-EGD 602 when the length of source data increases.

As the length L of the source data increases, the computational complexity of RLNC 601 may increase. However, although the length of the source data increases, the computational complexity of NC-EGD 602 may be almost constant. That is, when the length of the source data increases, the computational complexity of RLNC 601 may increase more greatly than the computational complexity of NC-EGD 602.

Thus, in a case of long source data, the computational complexity for network encoding/decoding by NC-EGD 602 may be improved than that for network encoding/decoding by RLNC 601.

According to an example embodiment, a network encoding method and apparatus may generate encoding data from source data by extracting an encoding coefficient matrix through a matrix decomposition.

According to an example embodiment, a network encoding method and apparatus may generate encoding data from source data using a unitary matrix as an encoding coefficient matrix through a matrix decomposition by an eigen-decomposition.

According to an example embodiment, a network decoding method and apparatus may determine source data from encoding data through a transposed matrix of an encoding coefficient matrix.

Meanwhile, the methods according to the example embodiments may be written in a program that may be executed on a computer and implemented on various recording media such as magnetic storage media, optical reading media, and digital storage media.

The various technologies described in this specification can be implemented as digital electronic circuitry, computer hardware, firmware, software, or combinations of these. The technologies can be implemented as a computer program, that is, an information carrier, for example, a computer program typically embodied in the form of a machine-readable storage (computer-readable medium) or a radio wave signal, to process operation of a data processing device, for example, a programmable processor, a computer, or a plurality of computers, or to control the operation. The computer program can be recorded in any form of program languages including a compiled language and an interpreted language, and can be developed in any form including an independent program or a module, a component, a subroutine, or any other unit suitable for use in a computing environment. The computer program may be deployed to be processed by one computer or multiple computers in one site, or distributed across multiple sites and interconnected through a communication network.

Processors suitable for the execution of a computer program include, for example, both general and special purpose microprocessors, and any one or more processors of any kind of digital computer. In general, a processor will receive instructions and data from a read-only memory (ROM), a random access memory (RAM), or both. Elements of a computer may include at least one processor for executing instructions and one or more memory devices for storing instructions and data. In general, a computer may include one or more mass storage devices, for storing data, for example, magnetic, magneto-optical discs, or optical discs, may receive data from them, may transmit data to them, or may be coupled to them to transceive data. Information carriers suitable for embodying computer program instructions and data include magnetic media, e.g., hard disks, floppy disks, and magnetic tapes, optical media, e.g., compact disk ROMs (CD-ROMs) and digital video disks (DVDs), magneto-optical media, e.g., floptical discs, semiconductor memory devices, e.g., RAMs, Flash memories, erasable programmable ROMs (EPROMs), electrically erasable programmable ROMs (EEPROMs). The processors and the memories may be supplemented by or incorporated in special purpose logic circuitry.

Further, the computer-readable medium may be an arbitrarily available medium that may be accessed by a computer and may include a computer storage medium and a transmission medium.

While this specification includes details of a plurality of specific implementations, these should not be understood as limitations of any invention or the scope to be claimed, but should be understood as descriptions of features that can be peculiar to specific embodiments of the specific invention. Specific features described herein may be implemented by being combined in a single embodiment in the context of an individual embodiment. On the other hand, various features described in the context of a single embodiment may be implemented individually or in appropriate sub-combinations in a plurality of embodiments. While features may work in specific combinations and may be described as initially claimed so, at least one feature may be excluded from a claimed combination in some cases, and the claimed combination may be changed to a sub-combination or a modification of the sub-combination.

Similarly, although drawings illustrate operations in a particular order, this does not mean that these operations should be performed in the illustrated particular order or sequence or that all illustrated operations should be performed to obtain a desired result. In a particular case, multitasking and parallel processing may be advantageous. Separation of various system components in the above-described embodiments does not mean that such separation is required for all embodiments. In general, described program components and systems may be integrated in a single software product or may be packed in multiple software products.

Meanwhile, embodiments for exemplifying the technical spirit of the present disclosure have been described and shown above, but the present disclosure is not limited to shown and described configurations and effects. Those of ordinary skill in the art would appreciate that various changes and modifications of the present disclosure can be made without departing from the technical spirit. Therefore, it is to be understood that all suitable changes, modifications, and equivalents fall within the scope of the present disclosure.

What is claimed is:

1. A network encoding method, comprising:
    generating a random symmetric matrix indicating a binary square matrix;
    extracting an encoding coefficient matrix by eigen-decomposing the generated random symmetric matrix into a unitary matrix, a diagonal matrix and a transposed matrix of the unitary matrix, the encoding coefficient matrix corresponding to the unitary matrix;
    generating encoding data by encoding source data using the extracted encoding coefficient matrix, the encoding data generated by computing a matrix product of the source data with the encoding coefficient matrix as follows:

$$\begin{pmatrix} y_1(1) & \cdots & y_1(L) \\ \vdots & \ddots & \vdots \\ y_N(1) & \cdots & y_N(L) \end{pmatrix} = \begin{pmatrix} u_1(1) & \cdots & u_N(1) \\ \vdots & \ddots & \vdots \\ u_1(N) & \cdots & u_N(N) \end{pmatrix} \begin{pmatrix} x_1(1) & \cdots & x_1(L) \\ \vdots & \ddots & \vdots \\ x_N(1) & \cdots & x_N(L) \end{pmatrix},$$

where $y_j$ is a j-th component of the encoding data, L is a length of the source data, N is a number of the source data, $u_j$ is a j-th component of the encoding coefficient matrix and $x_j$ is a j-th component of the source data;
    forming a data packet including the generated encoding data and the encoding coefficient matrix; and
    converting the formed data packet from a real number field to a Galois field,
    wherein a row of the encoding coefficient matrix is included as a header of the data packet and the encoding data is included as a payload of the data packet.

2. The network encoding method of claim 1, wherein the random symmetric matrix is a square matrix of which matrix components are symmetric with respect to a diagonal.

3. The network encoding method of claim 2, wherein the matrix components are selected at random from "0" or "1".

4. The network encoding method of claim 1, wherein the diagonal matrix includes components determined to be real numbers.

5. A network decoding method, comprising:
    converting a data packet including encoding data encoded from source data and an encoding coefficient matrix from a Galois field to a real number field;
    extracting the encoding coefficient matrix from a header of the converted data packet, the encoding coefficient matrix including a unitary matrix eigen-decomposed from a random symmetric matrix;
    extracting the encoding data from a payload of the converted data packet; and
    determining the source data based on the extracted encoding data and a transposed matrix of the extracted encoding coefficient matrix, the source data comprising a matrix product of the extracted encoding data and a transposed matrix of the extracted encoding coefficient matrix, the source data determined as:

$$\begin{pmatrix} y_1(1) & \cdots & y_1(L) \\ \vdots & \ddots & \vdots \\ y_N(1) & \cdots & y_N(L) \end{pmatrix} = \begin{pmatrix} u_1(1) & \cdots & u_N(1) \\ \vdots & \ddots & \vdots \\ u_1(N) & \cdots & u_N(N) \end{pmatrix} \begin{pmatrix} x_1(1) & \cdots & x_1(L) \\ \vdots & \ddots & \vdots \\ x_N(1) & \cdots & x_N(L) \end{pmatrix},$$

where $X_j$ is a j-th component of the source data, L is a length of the source data, N is a number of the source data, $u_j$ is a j-th component of the extracted encoding coefficient matrix, and $Y_j$ is a j-th component of the extracted encoding data.

6. A network encoding apparatus, comprising:
    a processor,
    wherein the processor is configured to:
        generate a random symmetric matrix indicating a binary square matrix,
        extract an encoding coefficient matrix by eigen-decomposing the generated random symmetric matrix into a unitary matrix, a diagonal matrix, and a transposed matrix of the unitary matrix, the encoding coefficient matrix corresponding to the unitary matrix, generate encoding data by encoding source data using the extracted encoding coefficient matrix, the encoding data including a matrix product of the source data and the encoding coefficient matrix, the encoding data generated as:

$$\begin{pmatrix} y_1(1) & \cdots & y_1(L) \\ \vdots & \ddots & \vdots \\ y_N(1) & \cdots & y_N(L) \end{pmatrix} = \begin{pmatrix} u_1(1) & \cdots & u_N(1) \\ \vdots & \ddots & \vdots \\ u_1(N) & \cdots & u_N(N) \end{pmatrix} \begin{pmatrix} x_1(1) & \cdots & x_1(L) \\ \vdots & \ddots & \vdots \\ x_N(1) & \cdots & x_N(L) \end{pmatrix}$$

where $y_j$ is a j-th component of the encoding data, L is a length of the source data, N is a number of the source data, $u_j$ is a j-th component of unitary matrix and $x_j$ is a j-th component of the source data, form a data packet including the generated encoding data and the encoding coefficient matrix, and convert the formed data packet from a real number field to a Galois field, wherein a row of the encoding coefficient matrix is included as a header of the data packet and the encoding data is included as a payload of the data packet.

7. The network encoding apparatus of claim 6, wherein the random symmetric matrix is a square matrix of which matrix components are symmetric with respect to a diagonal.

8. The network encoding apparatus of claim 7, wherein the matrix components are selected at random from "0" or "1".

9. The network encoding apparatus of claim 6, wherein the diagonal matrix includes components determined to be real numbers.

* * * * *